United States Patent [19]

Bond

[11] Patent Number: 4,686,470
[45] Date of Patent: Aug. 11, 1987

[54] MAGNETIC DISK FOR MEASURING THE AZIMUTH OF A TRANSDUCER HEAD

[75] Inventor: Charles R. Bond, Milpitas, Calif.

[73] Assignee: Verbatim Corporation, Sunnyvale, Calif.

[21] Appl. No.: 838,864

[22] Filed: Mar. 12, 1986

[51] Int. Cl.[4] .................... G11B 20/20; G11B 21/10; G01B 7/30
[52] U.S. Cl. ...................................... 324/207; 360/76
[58] Field of Search ................... 324/207, 208, 172; 360/76, 109

[56] References Cited

U.S. PATENT DOCUMENTS

| 2,938,962 | 5/1960 | Konins et al. | 360/76 |
| 3,900,888 | 8/1975 | Uchikoshi et al. | 360/76 |
| 4,254,440 | 3/1981 | Martin | 360/76 |
| 4,519,006 | 5/1985 | Nakamichi | 360/76 |
| 4,589,038 | 5/1986 | Radtke | 324/252 X |
| 4,616,281 | 10/1986 | Nakamura | 324/252 X |

FOREIGN PATENT DOCUMENTS 0089723  8/1978  Japan ........................ 360/76

Primary Examiner—Gerard R. Strecker
Attorney, Agent, or Firm—Dennis P. Monteith

[57] ABSTRACT

A magnetic disk includes a pair of azimuth test tracks of relatively narrow trackwise width located adjacent each other so that a magnetic head, the azimuth of which is to be measured, straddles both tracks at the same time. Each test track includes a recording pattern comprising a series of separate, uniformly spaced magnetic domains of alternating orientation, the recording pattern on one track being in a particular phase relative to the recording pattern on the other track. Upon playback, the magnetic head produces a composite playback signal comprising a series of localized peaks, the time between adjacent peaks being functionally related to head azimuth.

5 Claims, 7 Drawing Figures

MAGNETIC DISK FOR MEASURING THE AZIMUTH OF A TRANSDUCER HEAD

BACKGROUND OF THE INVENTION

1. Field of the Invention

The invention relates generally to analyzing the azimuth of a magnetic head used in a magnetic media read/write device. A presently preferred embodiment of the invention relates to a magnetic disk having a predetermined recording pattern for measuring head azimuth in a disc drive mechanism. The invention also has application to measuring head azimuth of a rigid disk drive, tape machine, or drum.

2. Description Relative to the Prior Art

In magnetic data storage media, to ensure unambiguous recording and playback, a magnetic head must establish and maintain a fixed orientation relative to each record track. A standrard orientation maintains a head centered transversely on a track and the head gap oriented at a 90-degree angle relative to the direction of the track. The angular orientation is known as head azimuth.

The widespread use of small computers, accompanied by both integral and separate disk drive mechanisms, has placed increasing numbers of magnetic storage devices in relatively unprotected environments. The relative vulnerability to mechanical damage of an inexpensive disk drive mechanism associated with a home and/or office small computer is significant, as compared with a data storage device associated with a large main frame computer installation.

A fundamental function of a floppy disk data storage system is the interfacing of data from different sources on different computers. In order to accomplish data transfer between computers, it is necessary that a head of a disk drive mechanism be oriented to a common standard.

A magnetic head used in playback of data should be oriented with the same azimuth as a magnetic head used for recording that data. If, for example, a slight change occurs in the azimuth of a head of a disk drive mechanism, that change will not affect the ability of the drive mechanism to reliably read data it recorded after the azimuth change occurred. The same disk drive mechanism (or a different disk drive mechanism) may not be able to read data, however, recorded before the change in azimuth occurred, because of the playback signal loss which occurs when there is a difference between recording and playback azimuths.

While many methods of measuring head azimuth are possible, a common practice with respect to a floppy disk drive mechanism has been to record signal bursts by a control head at various azimuth settings. The corresponding playback burst having the greatest amplitude is indicative of the head azimuth of a drive mechanism being analyzed. A disadvantage of this practice is the need for azimuth adjustments of the control head. Furthermore, the azimuth of the head being tested can merely be categorized, according to the azimuth settings selected for the control head.

SUMMARY OF THE INVENTION

In view of the foregoing, an object of the invention is to overcome the aforementioned problem of the prior art and, in so doing, provide for the quantitative measuring of the azimuth of a magnetic read/write head, without the need for multiple adjustments of the azimuth of a test control head. In its broadest sense, this object is achieved by providing a standard magnetic storage medium associated with a drive mechanism for the head to be measured, the storage medium containing a pair of specially recorded azimuth test tracks which cause a composite playback signal to be produced which is functionally related to the azimuth of the head being measured.

In a presently preferred embodiment of the invention, the magnetic storage medium comprises a flexible disk for measuring the head azimuth of a disk drive mechanism. The disk contains a pair of concentric test tracks of relatively narrow trackwise width located adjacent each other so as to be straddled at the same time by the head to be measured. Each of the test tracks includes a predetermined recording pattern comprising a series of separate magnetic domains of alternating orientation, the patterns being recorded in a particular phased relation to each other. Upon playback, a composite output signal is produced comprising a series of localized peaks with the time between adjacent peaks being functionally related to the azimuth of the playback head.

With the azimuth of the head being determined from a single playback signal, it is not necessary to provide a movable control head to measure the head azimuth of the drive mechanism being analyzed, as is commonly done in the art.

The invention and its other advantages will become more apparent in the detailed description of a preferred embodiment presented below.

DESCRIPTION OF THE DRAWINGS

The invention will be described with reference to the accompanying drawings, wherein.

DETAILED DESCRIPTION OF A PREFERRED EMBODIMENT RELATIVE TO THE INVENTION

Figure 1:
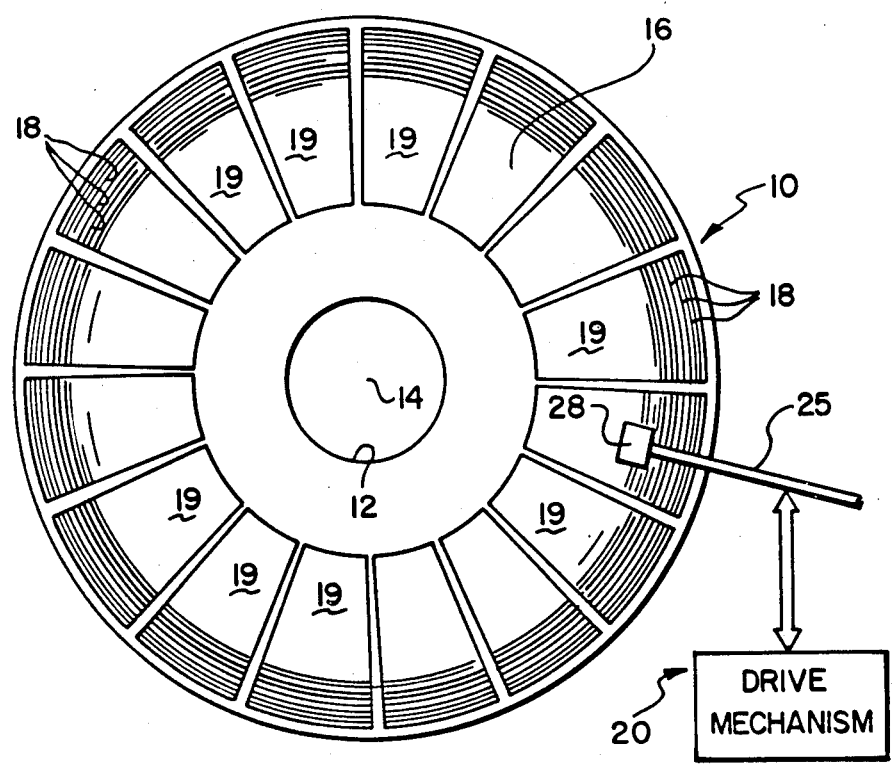
FIG. 1 is a top view of a flexible magnetic recording disk of the present invention.

FIG. 1 illustrates a typical flexible data storage disk 10, known commercially as a "floppy disk." The disk 10 has a central mounting aperture 12 which is coaxial with a disk central axis 14. The disk 10 includes a coating 16 of magnetizable material, such as ferric oxide, which is commonly applied to the entire surface of one or both sides of the disk. It should be recognized that both single and double-sided recording is common, and that if double-sided recording is utilized, both circular sides of the disk 10 include a coating 16.

In accordance with a widespread standard, the disk 10 has on each information-bearing side a plurality of concentric record tracks 18 coaxial with the axis 14. The disk 10 may further be divided into a plurality of separate sectors 19, each of which is defined in a radial direction by a pair of concentric circular edges (inner and outer) and in an angular direction by radial edges projecting from the axis 14. As is common practice in the art, the disk 10 may include sixteen sectors, such that data to be recorded is divided, within each record track, into sixteen blocks. The number of sectors can vary, however, for example, ten, twelve, twenty-four, or thirty-six sectors are commonly employed.

Figure 2:
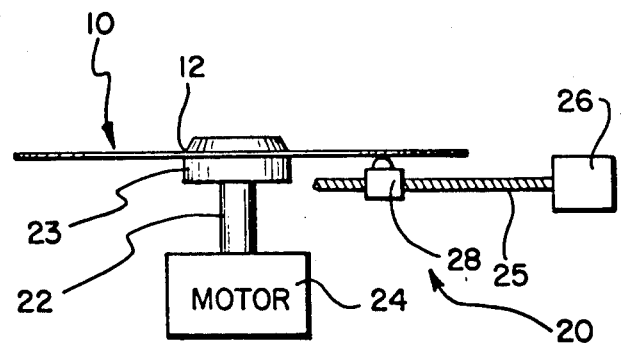
FIG. 2 is a diagrammatic illustration of a drive mechanism for processing the flexible disk of FIG. 1.

FIG. 2 illustrates a disk drive mechanism 20 for writing and reading data from the disk 10. As is known in the art, the mechanism 20 has electrical and mechanical characteristics common in the industry, such that a disk recorded on by one drive mechanism may be interchanged with other mechanisms for playback. In particular, the mechanism 20 comprises a spindle 22 including a gripper 23 engageable with the central aperture 12 for rotating the disk 10 under the influence of a spindle drive motor 24. A movable shaft 25, controlled, for example by a stepper motor 26, serves to selectively center a magnetic head 28 with respect to any of the record tracks 18. When switching from one track to an adjacent track, the motor 26 and the shaft 25 displace the head 28 exactly by the pitch of the record tracks, i.e. the distance between the centerline of one track and the centerline of an adjacent track.

In a usual format, a guardband separates adjacent record tracks, to keep cross talk between tracks to a minimum. To facilitate tracking, particularly when a disk is exchanged between drive mechanisms, the trackwise width of a playback head may be somewhat wider than a record track; thus, a limited misalignment of a playback head with the centerline of the track does not have any appreciable affect on the amplitude of a playback signal from that track.

The azimuth of the head gap relative to the record track is a further important feature for suitable interchangeability of a disk. In normal conditions, the head gap is oriented at a 90-degree angle relative to its associated record track. Any difference, between the azimuth of the head used for recording and the azimuth of the head used for playback, causes a disproportional reduction in playback signal. A significant difference in azimuth means that playback apparatus may not recognize the signals in the disk, whether or not those signals have been recorded at the correct azimuth. For example, if a drive mechanism having an incorrectly oriented head records on a disk, that mechanism may play back satisfactorily from the same disk, but may detect as defective any disk processed by a drive unit having a correctly oriented head. Conversely, a drive mechanism having a correctly oriented head would not be able to read from a disk recorded on by an incorrectly oriented head. Accordingly, it is advantageous for a user to be able to establish whether it is the disk drive mechanism used in playback which is incorrect or whether the disk is defective as the result of the drive mechanism used in recording.

In a presently preferred embodiment, the invention comprises a disk having the same physical features as any one of a number of known magnetic recording disks, for example, a 3½ inch, a 5¼ inch, etc. diameter disk. The disk, however, is suitably modified to accomplish head azimuth measurement. For that purpose, a disk, such as flexible disk 10, includes two adjacent azimuth test tracks, denoted 30 and 32, shown in FIG. 3. The test tracks have a relatively narrow trackwise width so that the magnetic head 28, of the drive mechanism 20 to be tested, straddles both tracks equally at the same time.

Figure 3:
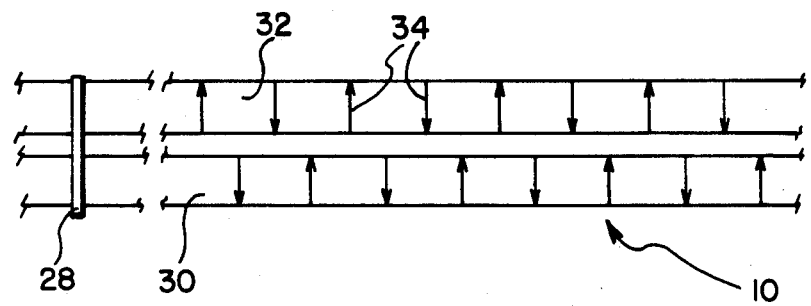
FIG. 3 is a diagram of a portion of the disk of FIG. 1.

Each of the test tracks, in turn, includes a recording pattern comprising a series of separate, uniformly spaced magnetic domains 34 of alternating orientation. Each alternating arrow on each test track of FIG. 3 represents the boundary or wall between a magnetic domain of one orientation and an adjacent domain of the opposite orientation. Each boundary is centered in a relatively narrow transition zone in which the flux signals change generally from one direction to the opposite direction. In that regard, the length of each transition zone, in a trackwise direction, is comparable to the gap length of the head 28. To that end, the two test tracks 30, 32 are recorded on a de-gaussed disk. The recording pattern on each test track is frequency synchronized such that the alternating flux signals are located precisely on each test track as desired. Preferably, the recording pattern on one test track, for example track 30, leads the recording pattern on the other test track, track 32, by ninety degrees (90°).

The principle under which head azimuth measurement is accomplished is that the trackwise width of the head gap is significantly greater than the length of the gap. With this feature and bearing in mind that a magnetic head responds in playback only to flux transitions, i.e. flux in the transition zone between adjacent domains of opposite orientation, a slight deviation of head azimuth results in a time difference between the detection of a change in a flux signal on one of the test tracks and the detection of the change in corresponding flux signal on the other of the test tracks. The detection of these changes in flux signals produces a composite playback signal having a pattern of localized peaks that is functionally related to the azimuth of the head.

Figure 4A:
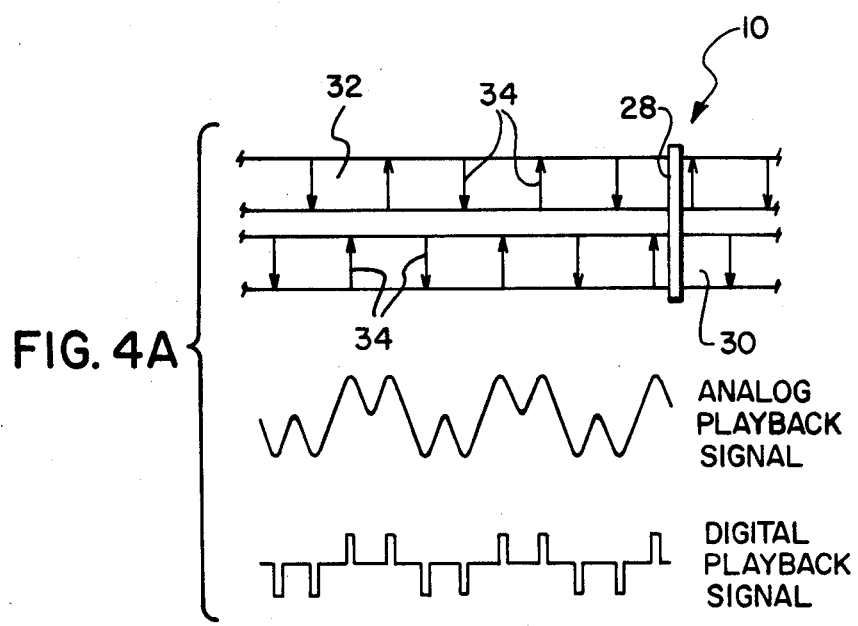
FIGS. 4A-4C are diagrammatic illustrations of three head azimuth conditions relating to the drive mechanism of FIG. 2.
Figure 4B:
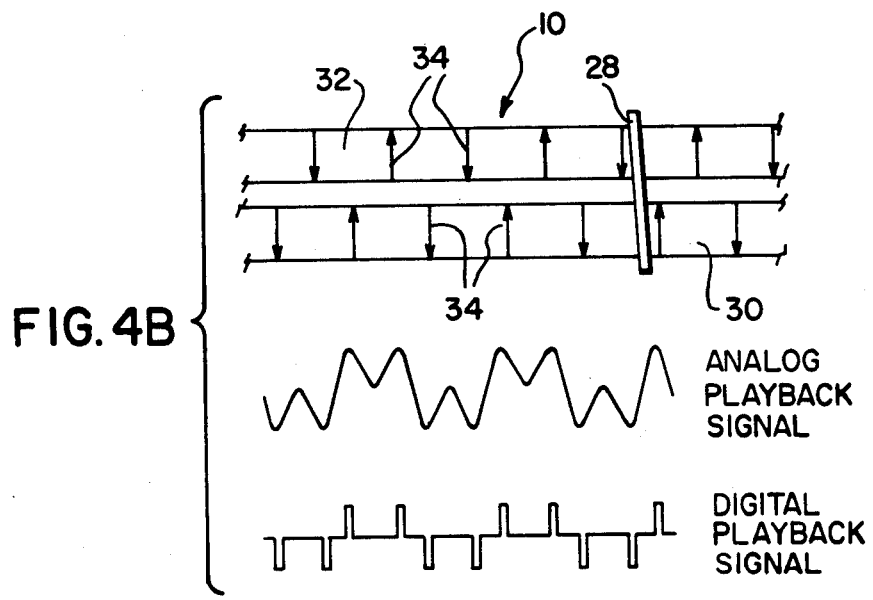
Figure 4C:
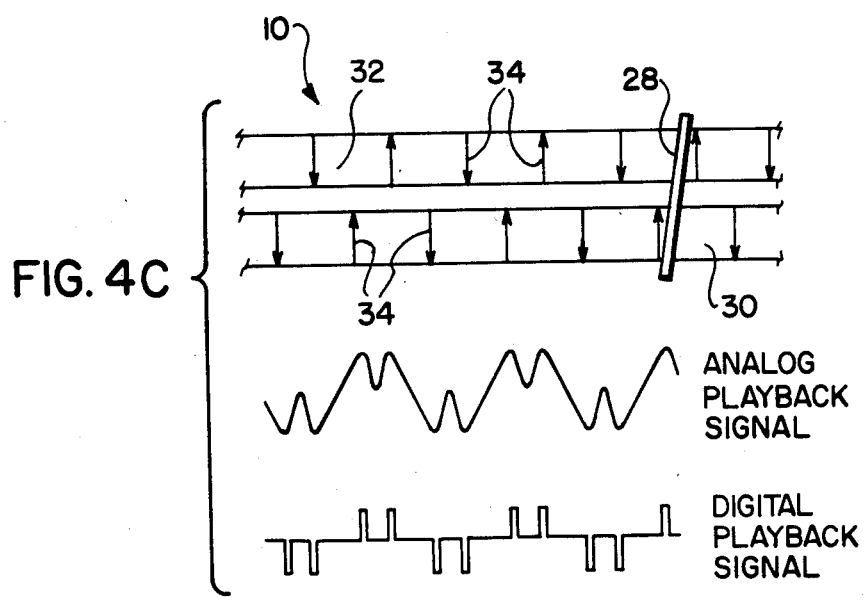

FIGS. 4A, 4B and 4C illustrate three head azimuth conditions, and the corresponding effect each of these conditions has on the playback signal when the recording pattern on one test track leads the recording pattern on the other track by 90°. With a correct head azimuth (0°), as shown in FIG. 4A, the head 28 alternatively detects signal flux at a domain boundary from one test track then at a domain boundary of the other test track at constant time intervals, as the disk 10 rotates. The time interval between successive detections depends, of course, on the rotational speed of the disk 10, and the spacing between alternating domains on a given track. Thus, the head 28 produces a composite playback signal comprised of uniformly spaced localized peaks. A digital representation of the playback signal shows most clearly that every other pair of localized peaks is of the opposite polarity.

FIGS. 4B and 4C illustrate respectively two different forms of azimuth error and how the corresponding playback signal appears. FIG. 4B shows a condition in which the head 28 is oriented counterclockwise from the correct azimuth. Assuming that the test tracks 30 and 32 are moving from right to left (clockwise rotation of the disk 10), as viewed in the drawing, the head 28 senses change in each flux signal on track 30 slightly sooner in time and change in each flux signal on track 32 slightly later in time; thus, with a counterclockwise azimuth error, adjacent playback peaks of the same polarity are further apart while adjacent playback peaks of opposite polarity are spaced closer to each other.

FIG. 4C illustrates the head 28 with a clockwise azimuth error. In this condition, the head 28 now senses change in each flux signal on the track 32 earlier in time while change in each flux signal on the track 30 is detected slightly later in time; as shown in FIG. 4C, adjacent playback peaks of the same polarity are relatively close in time, and adjacent playback peaks of the opposite polarity are further apart.

It is understood by those skilled in the art that FIGS. 4B and 4C exaggerate the degree of azimuth error with respect to the magnitude of a typical azimuth error, for the purpose of explaining the invention. Normal head azimuth errors are small in practice-on the order of a few minutes of arc, not the ten or fifteen degrees as shown.

Compared to a playback signal achievable with a properly oriented head (zero azimuth error), a head having an azimuth error results in some loss of playback signal amplitude. This is not presumed, however, to unnecessarily limit the aximuth measuring capability of the disk 10 because even a slight azimuth error produces a measurable change in timing of the playback signal peaks.

An oscilloscope can serve to display the analog playback signal on a screen. By measuring the time difference between adjacent pulses (of the same and opposing polarity), the azimuth of the head 28 can be measured and controlled.

Alternatively, suitable circuitry, responsive to the localized maximum and minimum of the analog signal, can serve for producing a digital signal representative of the playback signal. Likewise, by means of an oscilloscope or other means suitable for measuring the time intervals between digital pulses, head azimuth can be measured and thus controlled.

Figure 5:
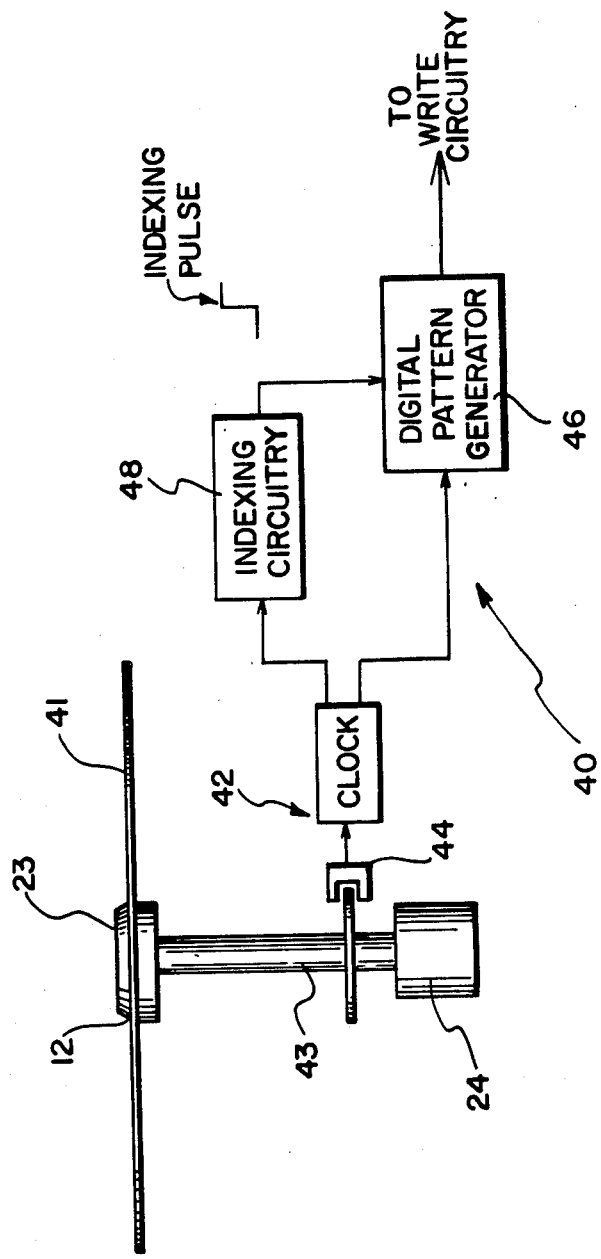
FIG. 5 is a schematic representation of apparatus used to achieve the disk recording pattern of the present invention.

FIG. 5 illustrates apparatus 40 for producing an azimuth analyzer disk 41 in accordance with the present invention. As mentioned previously, the recording patterns on each of the two azimuth test tracks must be in exact frequency synchronization. To that end, the recording patterns on both test tracks are to be recorded so that they are in bit-cell coincidence. More specifically, flux signal reversals are made to occur at predetermined angular positions on each test track, as desired.

For that purpose, a phase-locked clock generator 42 produces a master clock signal corresponding to the angular positio of a disk drive spindle 43. The clock generator 42 includes an optical encoder 44 which produces an output related to the speed and location of the spindle 43. A digital pattern generator 46, which receives the master clock signal, serves to apply an appropriate output to writing circuitry, which causes a narrow-width, zero-azimuth control head (not shown) to produce the desired recording patterns on each of the two azimuth test tracks for the disk 41. For that purpose, a recording operation for each test track must be initiated synchronously on corresponding rotations of the disk 41. To that end, indexing circuitry 48, responsive to an output of the phase-locked generator 42, applies an index pulse to the pattern generator 46.

An adjustment would be required to cause a movable head positioner to properly locate the control head for recording the azimuth test tracks. On a standard disk drive mechanism, this would consist of a simple, precision "misalignment."

By way of example, and without limitation, assume that the head azimuth of a 48 track-per-inch (TPI) disk drive mechanism is being measured. Such a head has a trackwise width of approximately 12 mils. For a disk azimuth analyzer for that mechanism, a 6-mil control head, commonly used in a standard 96 TPI system, or a smaller head, can appropriately serve for recording each of the test tracks.

It is important that the azimuth test tracks are not written on subsequent to characterization of the disk as an azimuth analyzer. Although a commercially available magnetic recording medium, such as ferric oxide, is adequate for a disk drive azimuth analyzer in accordance with the invention, it may be desirable to utilize a magnetic medium having higher coercivity than ferric oxide. Coercivity, which is sometimes called "magnetic hardness", is a term of art relating to the strength of a magnetic field required to reverse the direction of magnetization of a given magnetic material. Ferric oxide has a coercivity of approximately 300 oersteds. Other magnetic materials, however, have much higher values of coercivity. For example, cobalt-impregnated iron oxide has a coercivity of approximately 600 oersteds, while barium-ferrite and strontium-ferride have been found to have coercivity values in the range of 2000 to 3000 oersteds.

The higher the coercivity of the magnetic medium selected for a disk azimuth analyzer the greater the permanency of the data recorded thereon; thus, a disk analyzer with a high coercivity reduces the chance that the disk will be destroyed or magnetically altered during subsequent usage. A high coercivity magnetic material also requires, of course, a greater intensity field to record the azimuth test tracks in the first place. Therefore, a balance must be struck between the difficulty in preparing the azimuth analyzer, and the reliability and stability of the disk once it is prepared.

ADVANTAGEOUS TECHNICAL EFFECT

From the foregoing it is apparent that a magnetic disk has been disclosed for measuring the head azimuth in a disk drive mechanism. A particular advantage of a disk, in accordance with the invention, is that there is no longer a need for a movable control head as is required by a commonly used measurement technique employed in the art. A standard (0° azimuth) drive head mechanism can be used for producing the recording pattern used for measuring azimuth.

A further advantage of the present invention is the ability to quantitatively measure head azimuth rather than categorizing azimuth measurements as is presently done in the art.

The invention has been described in detail with particular reference to the measuring of recording head azimuth. It will be understood, however, that variations and modifications can be effected within the spirit and scope of the invention. For example, the invention is equally applicable to performing measurement of head azimuth on a rigid disk drive, a tape machine, or the like.

What is claimed is:

1. A magnetic disk for measuring the azimuth of a magnetic head of a disk drive mechanism, said magnetic disk comprising:

a pair of concentric test tracks of relatively narrow trackwise width located adjacent each other so that each is straddled at the same time by the head gap of the magnetic head to be measured, each of said test tracks including a recording pattern comprising a predetermined series of magnetic domains of alternating orientation arranged to provide, in the trackwise direction between each domain of one orientation and the adjacent domain of the opposite orientation, a relatively narrow transition zone, comparable to the length of the head gap but small relative to the length of a magnetic domain, the recording pattern on one test track being recorded out of phase with respect to the recording pattern on the other test track by a fixed predetermined amount so that, upon playback by the head to be measured, a composite output signal is produced comprising a time-ordered series of localized peaks corresponding to the resultant series of transition zones on both test tracks, with the timing between adjacent peaks being functionally related to the azimuth of the head being measured.

2. A magnetic disk as defined in claim 1 wherein the recording pattern on each test track is periodic, with the recording pattern on one of said test tracks leading the recording pattern on the other of said test tracks by approximately ninety degrees of the recording pattern period.

3. A magnetic disk as defined in claim 1 wherein each of the recording patterns is derived from a digital pattern generator which is responsive to a clock signal related to the angular position of said disk.

4. A flexible magnetic disk as defined in claim 1 wherein each recording pattern is recorded on a degaussed disk.

5. A flexible magnetic disk as defined in claim 1 wherein the test tracks are recorded on a layer of magnetic recording material having a relatively high coercivity.

* * * * *